US010463195B2

(12) United States Patent
Moss

(10) Patent No.: US 10,463,195 B2
(45) Date of Patent: Nov. 5, 2019

(54) COMBINED BARBECUE BEVERAGE DISPENSING SYSTEM

(71) Applicant: Fred Moss, La Mesa, CA (US)

(72) Inventor: Fred Moss, La Mesa, CA (US)

( * ) Notice: Subject to any disclaimer, the term of this patent is extended or adjusted under 35 U.S.C. 154(b) by 461 days.

(21) Appl. No.: 15/240,147

(22) Filed: Aug. 18, 2016

(65) Prior Publication Data

US 2018/0049588 A1 Feb. 22, 2018

(51) Int. Cl.
*A47J 37/07* (2006.01)
*B67D 1/00* (2006.01)
*B67D 1/08* (2006.01)

(52) U.S. Cl.
CPC .......... *A47J 37/0786* (2013.01); *B67D 1/00* (2013.01); *B67D 1/0001* (2013.01); *B67D 1/0857* (2013.01); *B67D 1/0875* (2013.01); *B67D 2210/00044* (2013.01); *B67D 2210/00128* (2013.01)

(58) Field of Classification Search
CPC .... A47J 37/07; A47J 37/0704; A47J 37/0786; B67D 1/00; B67D 1/0001; B67D 1/0857; B67D 1/0875; B67D 2210/00044; B67D 2210/00128
USPC .......................................................... 99/357
See application file for complete search history.

(56) References Cited

U.S. PATENT DOCUMENTS

| 617,713 | A | 1/1899 | Brackett |
| 1,582,346 | A | 4/1926 | Oster |
| 2,497,156 | A | 2/1950 | Davis |
| D229,660 | S | 12/1973 | Gammon |
| 4,664,026 | A | 5/1987 | Milloy |
| 4,665,891 | A | 5/1987 | Nemec |
| 5,033,449 | A | 7/1991 | Hanagan |
| D342,121 | S | 12/1993 | Lim |
| 5,341,793 | A | 8/1994 | Brown |
| D352,864 | S | 11/1994 | Parker |
| 5,480,170 | A | 1/1996 | Kaiser, II |
| D378,646 | S | 4/1997 | Dutro |
| D398,807 | S | 9/1998 | Fjelde |
| D411,072 | S | 6/1999 | Roundtree |
| 6,189,528 | B1 * | 2/2001 | Oliver ................. A47J 37/0704 126/25 R |
| D449,491 | S | 10/2001 | Measom |
| D460,656 | S | 7/2002 | Caulder |
| 6,658,991 | B2 * | 12/2003 | Backus ................. A47J 37/041 99/395 |
| 6,813,995 | B1 | 11/2004 | Sikes |
| 7,159,509 | B2 | 7/2007 | Starkey |
| D566,631 | S | 4/2008 | Shahan |
| D573,837 | S | 7/2008 | Drewery |
| 7,469,630 | B1 | 12/2008 | Ray |
| D623,887 | S | 9/2010 | Kusch et al. |
| D626,372 | S | 11/2010 | Taggart et al. |
| 7,861,892 | B1 * | 1/2011 | White ..................... B67D 1/06 222/108 |

(Continued)

*Primary Examiner* — Brian W Jennison
(74) *Attorney, Agent, or Firm* — Wagenknecht IP Law Group, PC

(57) ABSTRACT

Provided herein is a combined barbecue beverage dispensing system to enable a user to cook foods and conveniently dispense beverages at outdoor events. The system may include a power source and entertainment module for wired or wireless connectivity with an electric device, and can therefore stream audio via a one-way or two-way communication protocol.

24 Claims, 9 Drawing Sheets

(56) References Cited

U.S. PATENT DOCUMENTS

| | | | |
|---|---|---|---|
| D645,287 S | 9/2011 | Kusch et al. | |
| 8,231,036 B2 | 7/2012 | Campbell | |
| D686,867 S | 7/2013 | Ho | |
| 8,672,200 B2 | 3/2014 | O'Hare | |
| 8,931,400 B1* | 1/2015 | Allen | H04Q 9/00 |
| | | | 99/344 |
| 9,004,058 B1 | 4/2015 | Brown | |
| 2004/0168465 A1* | 9/2004 | Renken | B67D 1/0857 |
| | | | 62/390 |
| 2005/0155498 A1 | 7/2005 | Killion | |
| 2006/0096585 A1 | 5/2006 | Dahl | |
| 2006/0260599 A1 | 11/2006 | Butt | |
| 2008/0011143 A1 | 1/2008 | Varcoe | |
| 2008/0066733 A1 | 3/2008 | Wahl | |
| 2008/0163862 A1* | 7/2008 | Cartwright | A47B 55/00 |
| | | | 126/25 R |
| 2008/0245357 A1 | 10/2008 | Meether et al. | |
| 2008/0134946 A1 | 12/2008 | Owensby | |
| 2010/0132692 A1 | 6/2010 | Shaffer | |
| 2010/0176170 A1* | 7/2010 | O'Hare | B60R 9/06 |
| | | | 224/519 |
| 2015/0151692 A1 | 6/2015 | Sprang, Jr. | |
| 2015/0201804 A1 | 7/2015 | Liao | |
| 2015/0217609 A1 | 8/2015 | Ellis et al. | |
| 2015/0327723 A1* | 11/2015 | Leighton | A47J 37/0713 |
| | | | 126/25 R |
| 2016/0095328 A1 | 4/2016 | Reed | |
| 2016/0290653 A1 | 10/2016 | Roy et al. | |

\* cited by examiner

COMBINED BARBECUE BEVERAGE DISPENSING SYSTEM

BACKGROUND OF THE INVENTION

Field of the Invention

The invention relates generally to grills, and more specifically outdoor grills incorporating a beverage dispenser.

Background Information

Modern barbecue grills came into existence based on the development of a hemispheric grill design by George Stephen of Weber Brothers Metal Works and the advent of charcoal briquettes by E.G. Kingsford after witnessing a large amount of wood scraps being discarded from Henry Ford's assembly lines. Later, in the 1960s, a gas grill design was developed by two employees of ARKLA (Arkansas Louisiana Gas Company) to provide new ways to sell natural gas to their customers. Since then, grilling has continued to grow in popularity and is practiced in many venues from parks, backyards, and even public events such as sporting events.

Conventional grills come in a variety of sizes and shapes, and utilize charcoal or wood, or may use liquid fuels, such as gas or propane. Most large outdoor grills that are used for backyard or event cooking include a firebox mounted about waist high on a frame. The frame typically includes wheels so that the grill may be rolled to a convenient location in the yard.

During outdoor entertainment events, such as sporting events, tailgate parties, fireworks displays, parades, and picnics, it is often desirable to have many of the amenities used in conjunction with the grill available in a convenient location. For example, patrons of an outdoor entertainment event may wish to serve cold beverages alongside the grilled food. Accordingly, the present invention provides a combined barbecue beverage dispensing system that can incorporate a variety of extra features for entertaining cooks and patrons alike.

SUMMARY OF THE INVENTION

The present invention relates to outdoor grills incorporating a beverage dispenser. Accordingly, in one aspect, the invention provides a combined barbecue beverage dispensing system. The system includes a substantially cylindrical body having an axis extending along a horizontal plane, wherein the body is divided into a plurality of isolated chambers by vertical walls disposed therein, a rigid frame fixedly attached to a lower exterior surface of the body, the frame comprising at least two cabinets, each cabinet being positioned in alignment with at least one of the isolated chambers; at least one food grate slidingly disposed within at least one of the isolated chambers, thereby defining a firebox configured to contain a supply of combustibles that produce heat and smoke upon burning for purposes of cooking and smoke processing foods, wherein the firebox comprises a hinged lid and at least one vent disposed on an upper exterior surface of the body; and a draft system disposed within at least one of the isolated chambers, thereby defining a cooling box, the draft system comprising a draft tower fixedly attached to an upper exterior surface of the body in alignment with the cooling box, the draft tower comprising a tower housing, at least one valve and at least one pour spout, wherein the cooling box is configured to accept at least one beverage container, at least one pressurized canister, and a cooling means, wherein the firebox and cooling box are separated by at least one isolated chamber. The system may further include at least one shelf fixedly attached to an exterior surface of the frame and positioned parallel to a cooking surface of the food grate. Each shelf may have a textured surface, such as a metal having a diamond-plate pattern imprinted thereon.

The system may include at least one thermometer in each isolated chamber and configured to monitor the ambient temperature within the respective isolated chamber. Each thermometer may further include a temperature gauge disposed at a position on an exterior surface of the body corresponding with each isolated chamber. In various embodiments, the draft tower may include four valves, four pour spouts, and the cooling box may be configured to accept four beverage containers, wherein each valve and pour spout pair corresponds to one of the four beverage containers. In other embodiments, the draft tower includes two valves, two pour spouts, and the cooling box may be configured to accept two beverage containers, wherein each valve and pour spout pair corresponds to one of the two beverage containers. The beverage containers may be any of a beer keg, a blended drink keg, and a soft drink canister, or a combination thereof.

The system may also include an insulator disposed within the at least one isolated chamber separating the firebox from the cooling box, thereby defining an insulating box. Exemplary insulators useful in the system include, but are not limited to, fiberglass, heat resistant refractory mortars, silica fabrics, heat resistant polymers, liquidized rubber products, heat resistant alloys, and combinations thereof. The cooling means may be ice, a refrigeration unit, or a combination thereof.

To assist with dispensing beverages, the draft system may further include a service inset disposed within the upper exterior surface of the body and in alignment with the tower housing. In various embodiments, the service inset may include at least one drainage grate positioned parallel to a cooking surface of the food grate and in alignment with the at least one pour spout, wherein the at least one drainage grate is in fluid communication with a drain tube disposed within the frame.

The system may further include an electric power source disposed within the frame and configured to supply power to the refrigeration unit if present, and at least one electric socket mounted within the frame operatively connected to the power source and configured to distribute electrical power from the power source. In various embodiments, the system may also include a lighting system in electrical communication with the power source and configured to distribute light from at least one light source to one or more areas selected from the firebox, the cooling box, and an area surrounding the combined barbecue beverage dispensing system. The lighting system may include a control unit configured to control power supplied to the at least one light source. The light source may be an incandescent bulb, a fluorescent bulb, an LED bulb, or a neon bulb.

In various embodiments, the system may also include a rotisserie disposed within the firebox. The rotisserie may include at least one spit positioned parallel to the axis of the body and at least one motor in electric communication with the power source, wherein the at least one motor is configured to rotate the at least one spit along the axis of the body. In certain embodiments, the rotisserie may include up to three or more spits, each positioned parallel to the axis of the body and being rotatable along the axis. When more than one spit is used, the rotisserie may be further configured to rotate the spits relative the heat source of the firebox.

The system may further include an entertainment module disposed within the frame and in electrical communication with the power source, the entertainment module being configured for wired or wireless communication, such as one-way or two-way transmission of information, with one or more electronic devices selected from the group consisting of a mobile device, a home computer, a television, and a home entertainment system. Exemplary mobile devices include, but are not limited to, a cellular phone, a tablet computer, a laptop computer, or a wireless remote controller. The entertainment module may also include at least one speaker for broadcasting an audio stream from the one or more electronic devices. In certain embodiments, the entertainment module may further include one or more microphones configured to capture sound from an area surrounding the combined barbecue beverage dispensing system. The wireless communication may be selected from the group consisting of infrared transmission, Bluetooth protocol, radio frequency, Zigbee wireless technology, GPS, Wi-Fi, WiMAX, and mobile telephony, and may be configured to send/receive information including, but not limited to, temperature information, time information, fill level information about each of the one or more beverage containers, gas fill level of the pressurized canister, audio files, and telecommunication information.

DETAILED DESCRIPTION OF THE INVENTION

Before the present systems and devices are described, it is to be understood that this invention is not limited to particular configurations and designs described, as such configurations and designs may vary. It is also to be understood that the terminology used herein is for purposes of describing particular embodiments only, and is not intended to be limiting, since the scope of the present invention will be limited only in the appended claims.

As used in this specification and the appended claims, the singular forms "a", "an", and "the" include plural references unless the context clearly dictates otherwise. Thus, for example, references to "the device" includes one or more devices, and/or configurations of the type described herein which will become apparent to those persons skilled in the art upon reading this disclosure and so forth.

The term "comprising," which is used interchangeably with "including," "containing," or "characterized by," is inclusive or open-ended language and does not exclude additional, unrecited elements or method steps. The phrase "consisting of" excludes any element, step, or ingredient not specified in the claim. The phrase "consisting essentially of" limits the scope of a claim to the specified materials or steps and those that do not materially affect the basic and novel characteristics of the claimed invention. The present disclosure contemplates embodiments of the invention systems and devices corresponding to the scope of each of these phrases. Thus, a system or device comprising recited elements contemplates particular embodiments in which the system or device consists essentially of, or consists of, those elements.

Unless defined otherwise, all technical and scientific terms used herein have the same meaning as commonly understood by one of ordinary skill in the art to which this invention belongs. Although any methods and materials similar or equivalent to those described herein can be used in the practice or use of the invention, the preferred methods and materials are now described.

Figure 1:
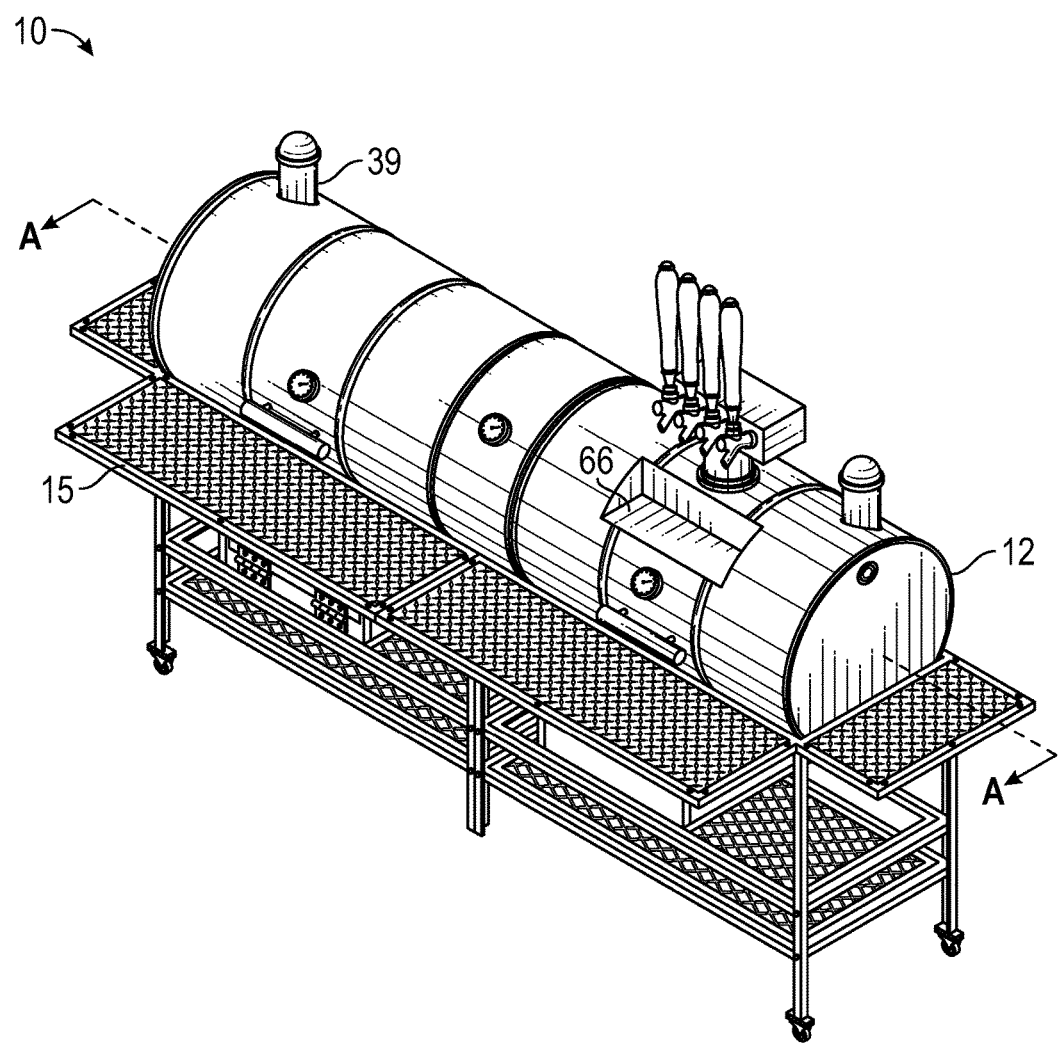
FIG. 1 shows a front perspective view of an exemplary embodiment of the combined barbecue beverage dispensing system.
Figure 2:
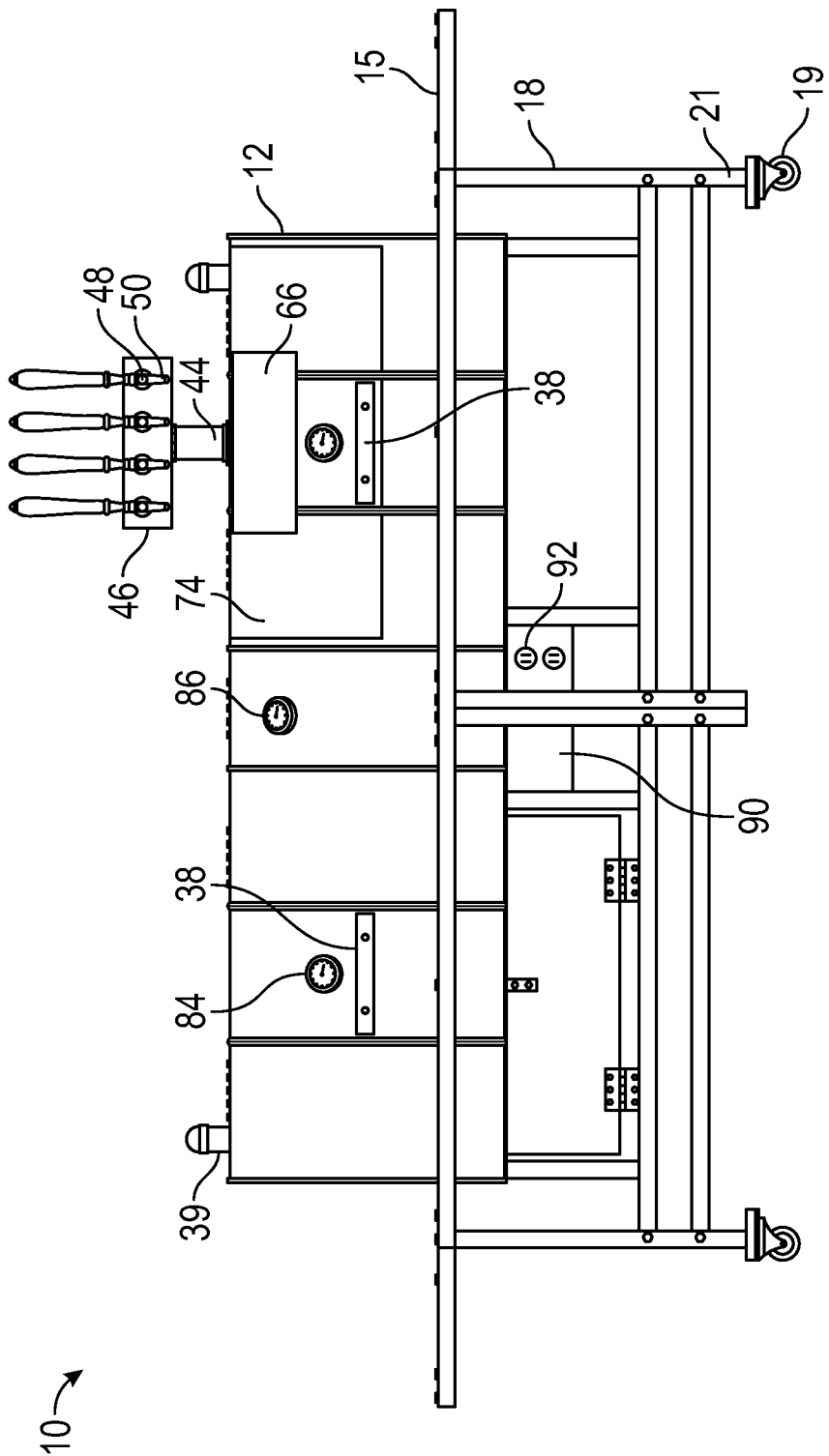
FIG. 2 shows a front view of the same exemplary embodiment shown in FIG. 1.
Figure 3:
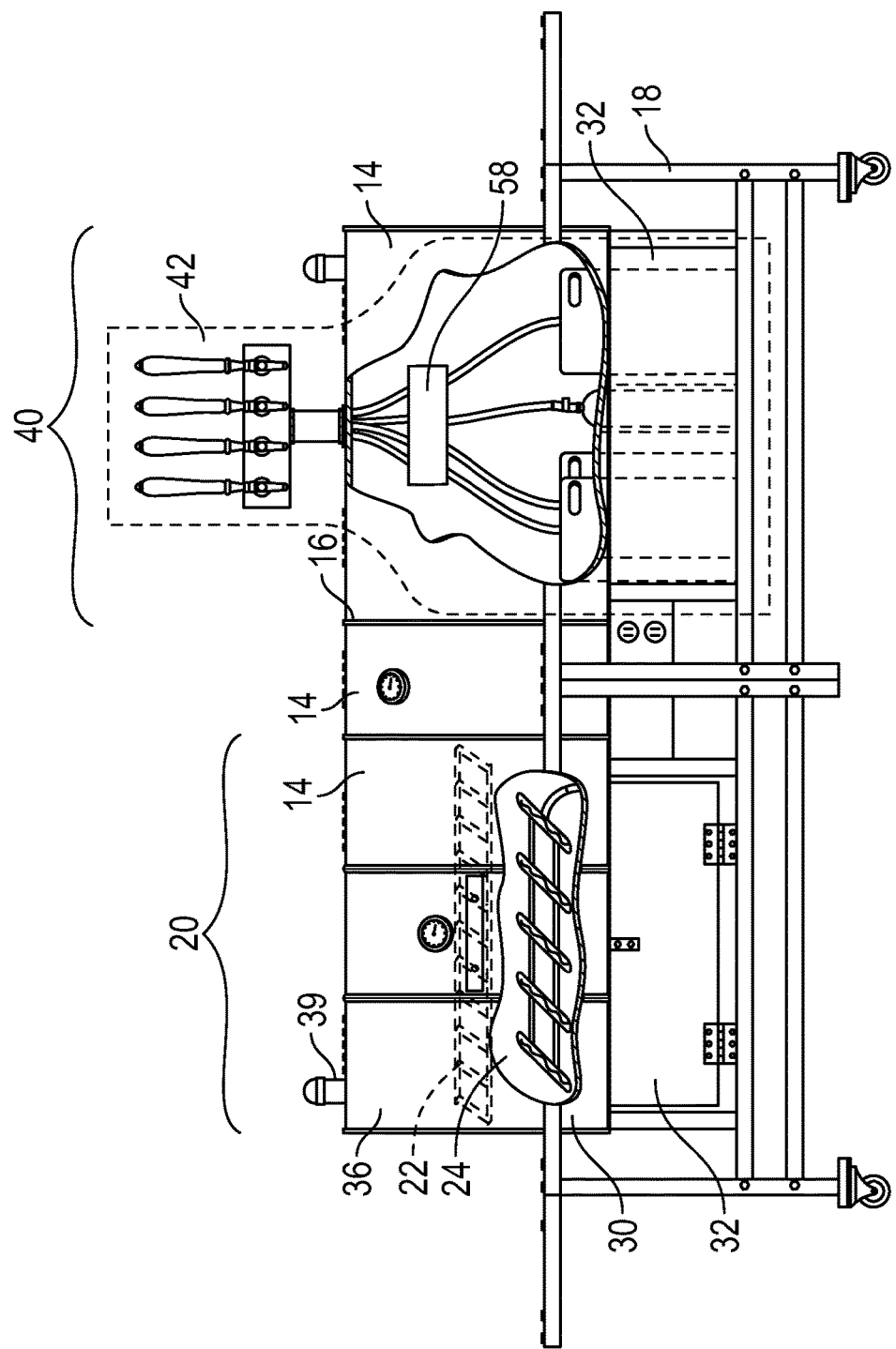
FIG. 3 shows a front cut-away view of the same exemplary embodiment shown in FIG. 1.

Referring now to FIGS. 1-3, there is provided a combined barbecue beverage dispensing system 10. The system 10 includes a substantially cylindrical body 12 having an axis A extending along a horizontal plane. In various embodiments, the substantially cylindrical body 12 may be formed from a metal barrel, such as a steel 55-gallon drum. In other embodiments, the substantially cylindrical body 12 may be formed from any material capable of withstanding the heat required to cook various foods either by means of exposing the food to an open flame, heated convection air (such as a smoker), or a combination thereof.

The body 12 may be divided into a plurality of isolated chambers 14 by substantially vertical walls 16 disposed therein. The vertical walls 16 may be permanently attached to the body 12, such as by welding or otherwise permanent bonding, or may be moveably attached to the body 12, such as by incorporation of one or more clamps (not shown). Each isolated chamber 14 is configured to serve a predefined function within the combined barbecue beverage dispensing system 10.

Figure 4:
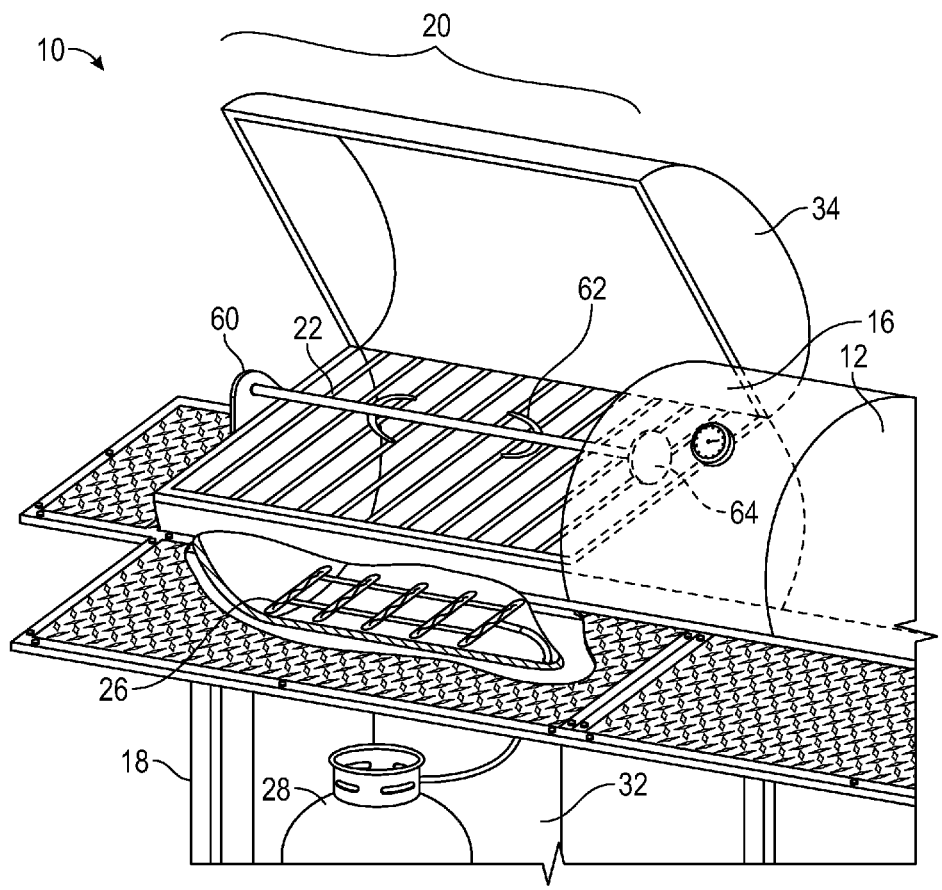
FIG. 4 shows a close-up perspective view of the firebox and insulating box of an exemplary embodiment of the combined barbecue beverage dispensing system including a rotisserie.
Figure 5:
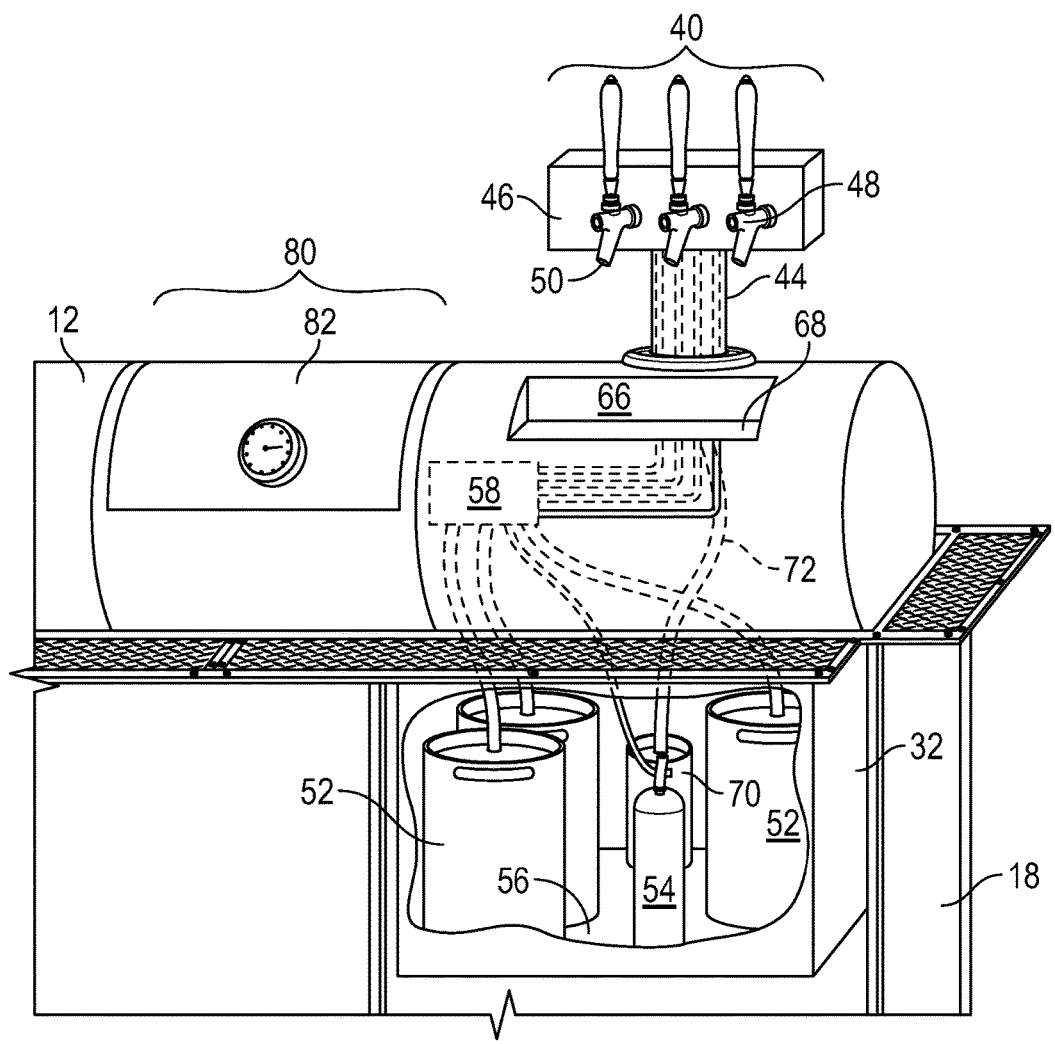
FIG. 5 shows a close-up perspective view of the cooling box and insulating box of an exemplary embodiment of the combined barbecue beverage dispensing system.

For example, the left-most isolated chamber 14 may include at least one food grate 22 upon which the food to be cooked is placed, and may therefore be referred to as the firebox 20. In various embodiments, the at least one food grate 22 is slidingly disposed within the firebox 20 in a position parallel to the ground so as to keep foods to be cooked in place. The firebox 20 may further be configured to contain a supply of combustibles 24 that produce heat and smoke upon burning for purposes of cooking and smoke processing foods. As shown in FIG. 4, the firebox 20 may further include a burner 26 in fluid communication with a fuel storage tank 28, which may be used either alone or in combination with the combustibles 24 for the purpose of cooking foods.

The lower exterior surface 30 of body 12 is fixedly attached to a rigid frame 18. In various embodiments, the rigid frame may include at least two cabinets 32 to house components of the system 10. Each of the at least two cabinets 32 may be positioned directly beneath and in alignment with each of the isolated chambers 14. Thus, for example, in an embodiment where the body 12 is divided into three isolated chambers 14, rigid frame 18 may include three cabinets 32, where each cabinet 32 is disposed directly beneath a corresponding isolated chamber 14. However, in certain variations of that same embodiment, rigid frame 18 will include only two cabinets 32, where each cabinet 32 is disposed directly beneath the two outer-most isolated chambers 14. In various embodiments, the rigid frame 18 may further include wheels 19 mounted to each leg 21 thereof to facilitate moving the system 10.

Also attached to the rigid frame 18 may be at least one shelf 15 disposed adjacent to the lower exterior surface 30 of body 12, where the at least one shelf 15 is positioned substantially parallel to the cooking surface of the food grate 22. Such a shelf provides a working surface for food preparation and beverage serving. In various embodiments, the system 10 may include at least one shelf 15 per isolated chamber 14 and the shelves 15 may be positioned in locations surrounding the lower exterior surface 30 of the body 12. In certain embodiments, the system 10 may include one shelf on each side of the body 12, and one shelf positioned in alignment with the two outer-most isolated chambers 14. The shelves 15 may be fixedly attached to the rigid frame 18, such as by welding or bonding, or may be removably or hingedly attached to the rigid frame 18 to facilitate storage and/or transport of the system 10.

Exemplary materials from which the shelf surface may be formed include, but are not limited to, metal, wood, plastic, porcelain, ceramic, synthetic or natural stone, and any material capable of withstanding the heat produced by the firebox 20. In various embodiments, the at least one shelf 15 has a textured surface, such as a diamond plate surface, to prevent items from slipping off from the shelf 15.

The firebox 20 may further include a hinged lid 34, which may encompass a portion of the upper exterior surface 36 of the body 12 (see FIG. 4). The hinged lid 34 may include a horizontally mounted handle 38 disposed in proximity to the outer edge of the lid 34. In various embodiments, the hinged lid 34 may further include one or more vents 39 configured for venting smoke and/or heated air for a laminar effect to introduce oxygen into the firebox 20. In various embodiments, the one or more vents 39 may be disposed on an upper exterior surface 36 of body 12 that is not part of the hinged lid 34.

Also disposed inside the firebox 20 may be an ash collection pan (not shown) positioned underneath the combustibles 24. The collection pan has a floor and a surrounding pan wall. As the combustibles 24 burn to ash, smaller bits of burning combustibles 24 and combustive byproducts from the food and fuel collect on the floor. In certain embodiments, the collection pan may have integrated handles for grasping and lifting the collection pan out of the firebox 20 in order to dispose of byproducts after the system 10 is used. In other embodiments, the lower exterior surface 30 of the body 12 may include an access panel through which the pan may be removed from the firebox 20 in order to dispose of byproducts after the system 10 is used.

The firebox 20 may further include a rotisserie 60 removably mounted parallel to axis A over the food grate 22 (FIG. 4). Rotisserie 60 may include at least one spit 62 disposed in mechanical communication with at least one electric motor 64 configured to rotate the at least one spit 62 along axis A. Electric motor 64 may be mounted at either side of the firebox, and in certain embodiments, may be mounted within the isolated chamber 14 immediately adjacent to the firebox 20. In certain embodiments, the rotisserie 60 may include up to three or more spits 62, each positioned parallel to the axis of the body 12 and being rotatable along the axis. When more than one spit is used, the rotisserie 60 may be further configured to rotate the spits 62 relative the heat source of the firebox.

With reference now to FIGS. 1-3, 5, and 6, and continuing with the exemplary configuration of the combined barbecue beverage dispensing system 10, the right-most isolated chamber 14 may include a draft system 42 for dispensing one or more beverages, and may therefore be referred to as the cooling box 40. The draft system 42 may include a draft tower 44 fixedly attached to an upper exterior surface 36 of the body 12 in alignment with the cooling box 40. The draft tower 44 may include a tower housing 46, which includes at least one valve 48 and at least one pour spout 50. The cabinet 32 disposed directly beneath the cooling box 40 is integrated with and forms the lower area of the cooling box 40. Thus, cabinet 32 may be configured to accept and store at least one beverage container 52, at least one pressurized canister 54, and a cooling means 56. Exemplary cooling means 56 include, but are not limited to, ice and a refrigeration unit.

The at least one beverage container 52 may be a beer keg, a blended drink keg, or a soft drink canister. It should be understood that when more than one beverage container 52 is used in the draft system 42, any combination of beer keg, blended drink keg, and soft drink canister may be used in order to provide a choice of beverage to patrons. Also disposed within the cooling box 40 is a manifold 58 in fluid communication with the at least one beverage container 52 and the at least one valve 48 of the draft tower 44. The manifold 58 is also configured to accept pressurized gas from the at least one pressurized canister 54 and, when the at least one valve 48 is opened, allow fluid to flow from the at least one beverage container 52 through the at least one pour spout 50. In various embodiments, where a carbonated beverage is desired, the manifold 58 may further combine the pressurized gas from the pressurized gas canister 54 with the fluid of the at least one beverage container 52 prior to flowing the fluid to the at least one pour spout 50. In certain embodiments, the manifold 50 may further include a gauge (not shown) for monitoring gas pressure supplied from the at least one gas canister 54.

Exemplary gases which may be contained within pressurized gas container 54 include, but are not limited to, carbon dioxide, nitrogen, oxygen, and other gases that are generally regarded as safe for use in and around consumable foods and beverages. The draft system 42 may further include a wand or dispensing gun (not shown) attached to the manifold 58 by a hose for dispensing one or more of the beverages at a distance from the body 12.

Figure 8:
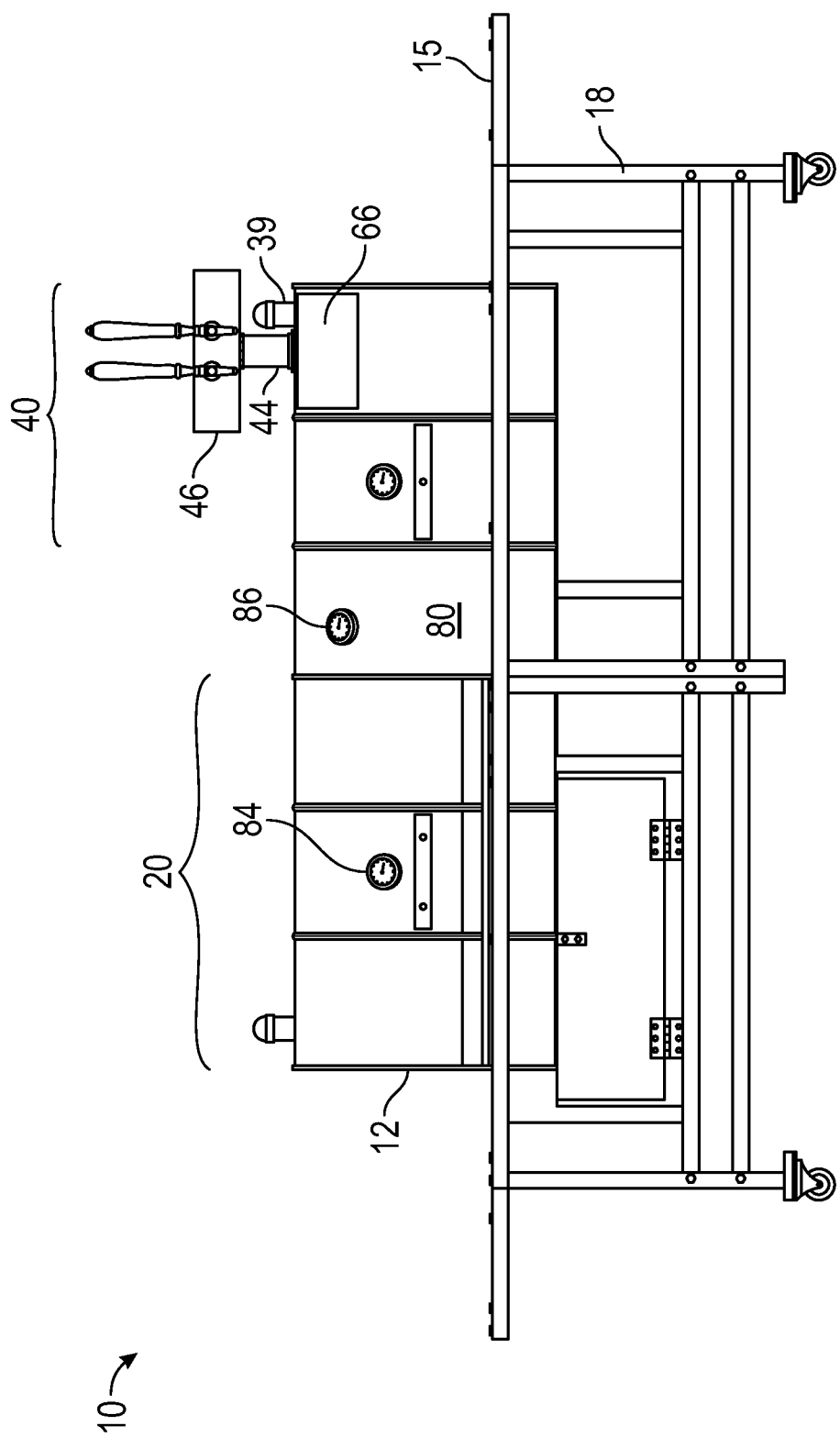
FIG. 8 shows a front view of an exemplary embodiment of the combined barbecue beverage dispensing system having two beverage valves and two pour spouts.
Figure 9:
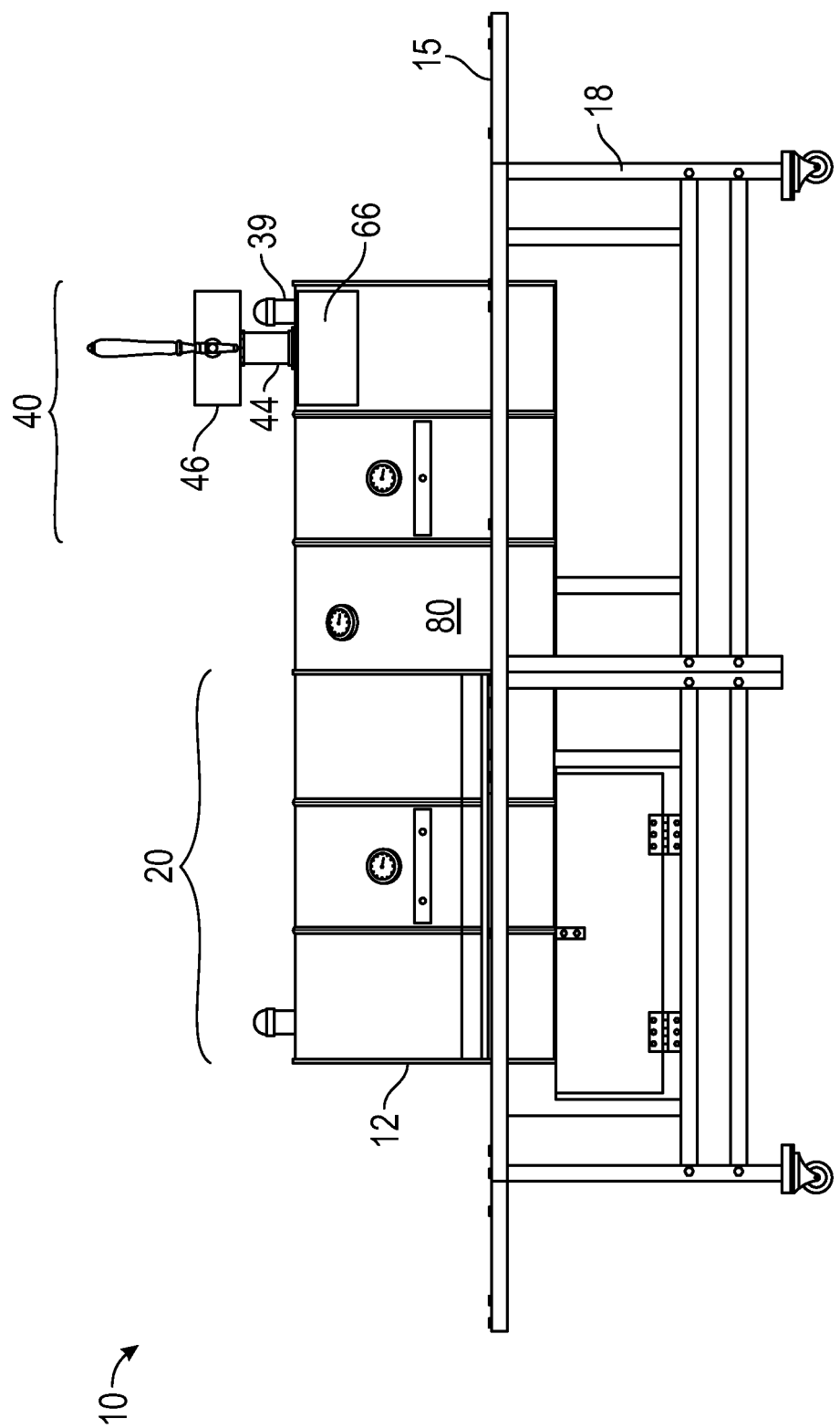
FIG. 9 shows a front view of an exemplary embodiment of the combined barbecue beverage dispensing system having one beverage valve and one pour spout.

In various embodiments, the draft system 42 may include four valves 48, four pour spouts 50, and the cooling box 40 may be configured to accept four beverage containers 52 in addition to the pressurized canister 54, where each pair of valve 48 and pour spout 50 corresponds to one of the beverage containers 52. However, depending on the user's needs, draft system 42 may be provided with one to three valves 48 and one to three pour spouts 50, each pair corresponding with an individual beverage container 52. For example, in a smallest configuration, draft system 42 may include a single valve 48 and a single pour spout 50 configured to dispense fluid from a single beverage canister 52, shown in FIG. 9. Likewise, draft system 42 may include two valves 48 and two pour spouts 50, each pair of valve and pour spout corresponding with an individual beverage container 52, as shown in FIG. 8.

The draft tower 44 may be formed in any shape desired, provided that the pour spout 50 is a sufficient distance from the upper exterior surface 36 of body 12 to allow for a glass to fit thereunder for dispensing the beverage. In various embodiments, the draft tower 44 may have a cross section along a plane parallel to the food grate 22 that is substantially circular, oval, square, hexagonal, octagonal, etc. Likewise, tower housing 46 may be formed in any shape desired, provided that there is a rigid surface upon which the at least one valve 48 and at least one pour spout 50 may be mounted.

Disposed in the upper exterior surface 36 may be at least one service inset 66 positioned in alignment with tower housing 46. Service inset 66 may include at least one drainage grate 68 positioned parallel to the cooking surface of the food grate 22 and in alignment with the at least one pour spout 50 such that any dispensed fluid flowing from the at least one valve 50 that is not collected in a drinking vessel flows through the drainage grate 68 and into a waste container 70 via a drainage tube 72, which may be disposed within cooling box 40. Alternatively, or in addition thereto, liquid waste collected from the drainage grate 68 may be allowed to flow through a drain (not shown) provided on a lower exterior surface of the cooling box 40.

The cooling box 40 may further include a hinged lid 74, which may encompass a portion of the upper exterior surface 36 of the body 12, to provide access to the inner workings of the draft system 42 and/or the cooling means 56. The hinged lid 74 may include a horizontally mounted handle 38 disposed in proximity to the outer edge of the lid 74. In various embodiments, the hinged lid 74 may further include one or more vents 39 configured for venting air within the cooling box 40. In various embodiments, the one or more vents 39 may be disposed on an upper exterior surface 36 of body 12 that is not part of the hinged lid 34.

Continuing with the exemplary configuration of the combined barbecue beverage dispensing system 10, separating the firebox 20 from the cooling box 40 is at least one isolated chamber 14, which serves as an insulating box 80. Disposed within the insulating box 80 may be one or more insulators configured to thermally separate the firebox 20 from the cooling box 40. Exemplary insulators that may be provided within the insulating box 80 include, but are not limited to, fiberglass, heat resistant refractory mortars, silica fabrics, heat resistant polymers, liquidized rubber products, heat resistant alloys, and combinations thereof. In certain embodiments, insulating box 80 may also include a hinged lid 82, which may encompass a portion of the upper exterior surface 36 of the body 12, to provide access to the interior of the insulating chamber 80. The hinged lid 82 may include a horizontally mounted handle (not shown) disposed in proximity to the outer edge of the lid 82.

As may be appreciated, the number of isolated chambers 14 is limited only by the size of body 12 and the number of vertical walls 16 disposed therein. Thus, for example, insulating box 80 may include more than one isolated chamber 14, each configured to hold the same or a different insulator for added insulating capability. In various embodiments, at least one of the isolated chambers 14 included within insulating box 80 is hermetically sealed and includes an air valve (not shown) through which a vacuum may be drawn for further insulating capability. Likewise, each of the firebox 20 and cooling box 40 may be sub-divided into multiple isolated chambers 14 depending on the intended use and desires of the user.

The system 10 may further include at least one thermometer 84 disposed in the upper exterior surface 36 of the body 12. In various embodiments, the system 10 may include at least one thermometer 84 for each isolated chamber 14, and may be disposed with each of the hinged lids (34, 74, 82) or may be disposed in a portion of the upper exterior surface 36 of the body 12 that is not part of the lids. As may be understood, the at least one thermometer 84 may have either have an analog gauge providing temperature information to the user or may include a digital display for providing the temperature information. Additionally, in embodiments where one of the isolated chambers 14 of the insulating box 80 contains a vacuum, that isolated chamber 14 may further include a pressure gauge 86 for monitoring the vacuum contained therein.

Disposed within the rigid frame 18 of the system 10, may also be an electric power source 90 configured distribute electrical power to any electric accessory provided in the system 10. The electric power source 90 may further include at least one electric socket 92 that is operatively connected to the power source 90 and configured to distribute electrical power from the power source 90. Thus, when present, the refrigeration unit may be in electric communication with the power source 90. Additionally, when present, the electric motor 64 of the rotisserie 60 may also be in electric communication with the power source 90.

Figure 6:
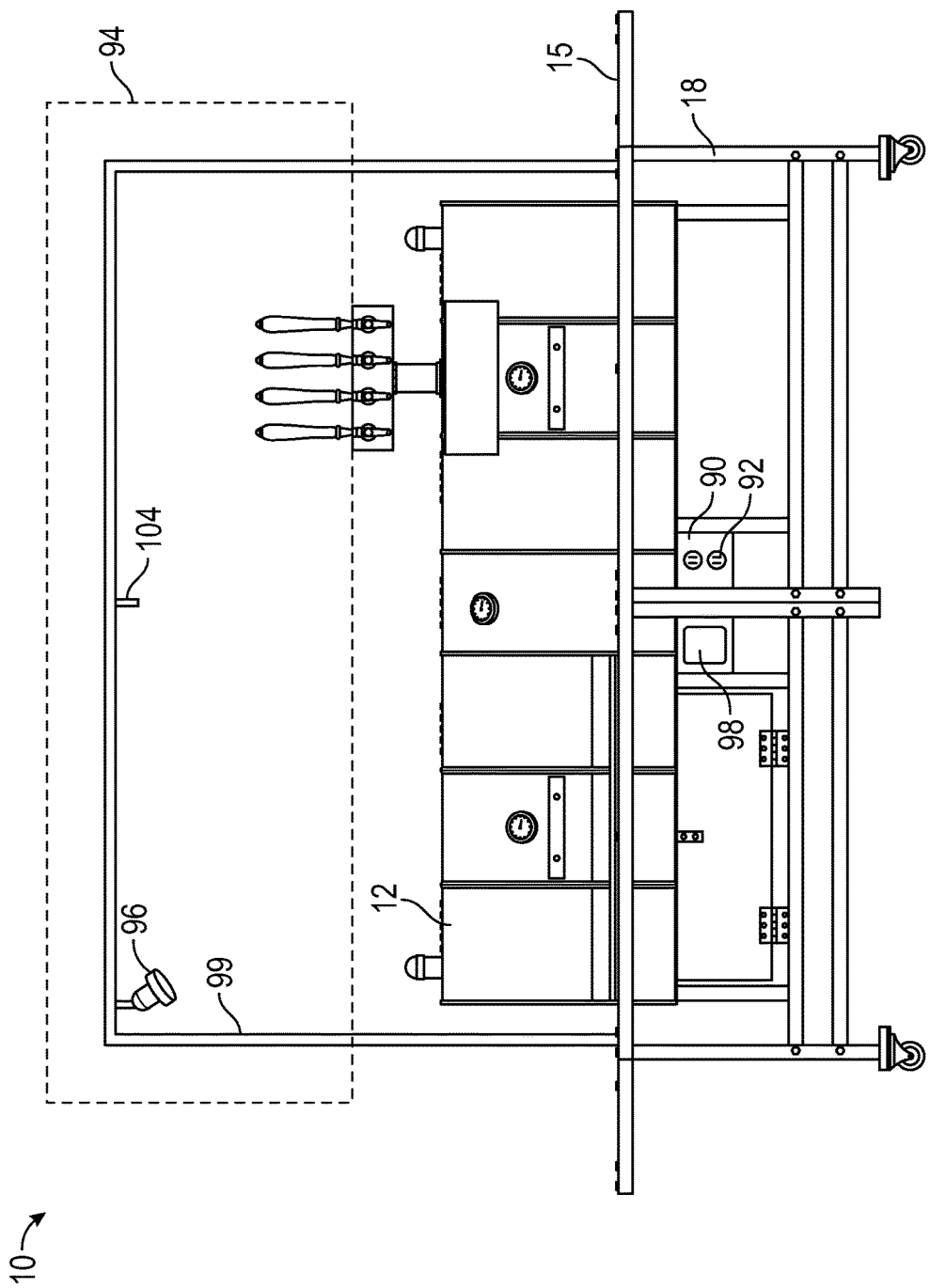
FIG. 6 shows a front view of an exemplary embodiment of the combined barbecue beverage dispensing system with lighting system and power source.

With reference now to FIG. 6, the combined barbecue beverage dispensing system 10 may further include a lighting system 94 in electrical communication with the power source 90 and configured to distribute light from at least one light source 96 to one or more areas selected from the firebox, the cooling box, and an area surrounding the combined barbecue beverage dispensing system 10. In various embodiments, the lighting system 94 may include a control unit 98 configured to control power supplied to the at least one light source 96. The control unit 98 may be integrated into the power source 90 or may be a stand-alone unit disposed within the rigid frame 18. In various embodiments, the control unit 98 may include one or more switches for individually controlling the at least one light source 96, or may include a digital touchscreen providing a user interface for controlling the at least one light source as well as other features and/or accessories of the system 10. Exemplary light sources useful in the lighting system 94 include, but are not limited to, an incandescent bulb, a fluorescent bulb, an LED bulb, and a neon bulb. It should be understood that the lighting system 94 may include any combination of different types of light sources, as desired by the end user. In various embodiments, the lighting system 94 may also include a stand 99 attached to the rigid frame 18 and configured to hold the at least one light source 96. The stand 99 may be fixedly attached to the rigid frame 18, such as by welding or bonding, or may be hingedly or removably attached to the rigid frame 18 such as by fasteners.

Figure 7:
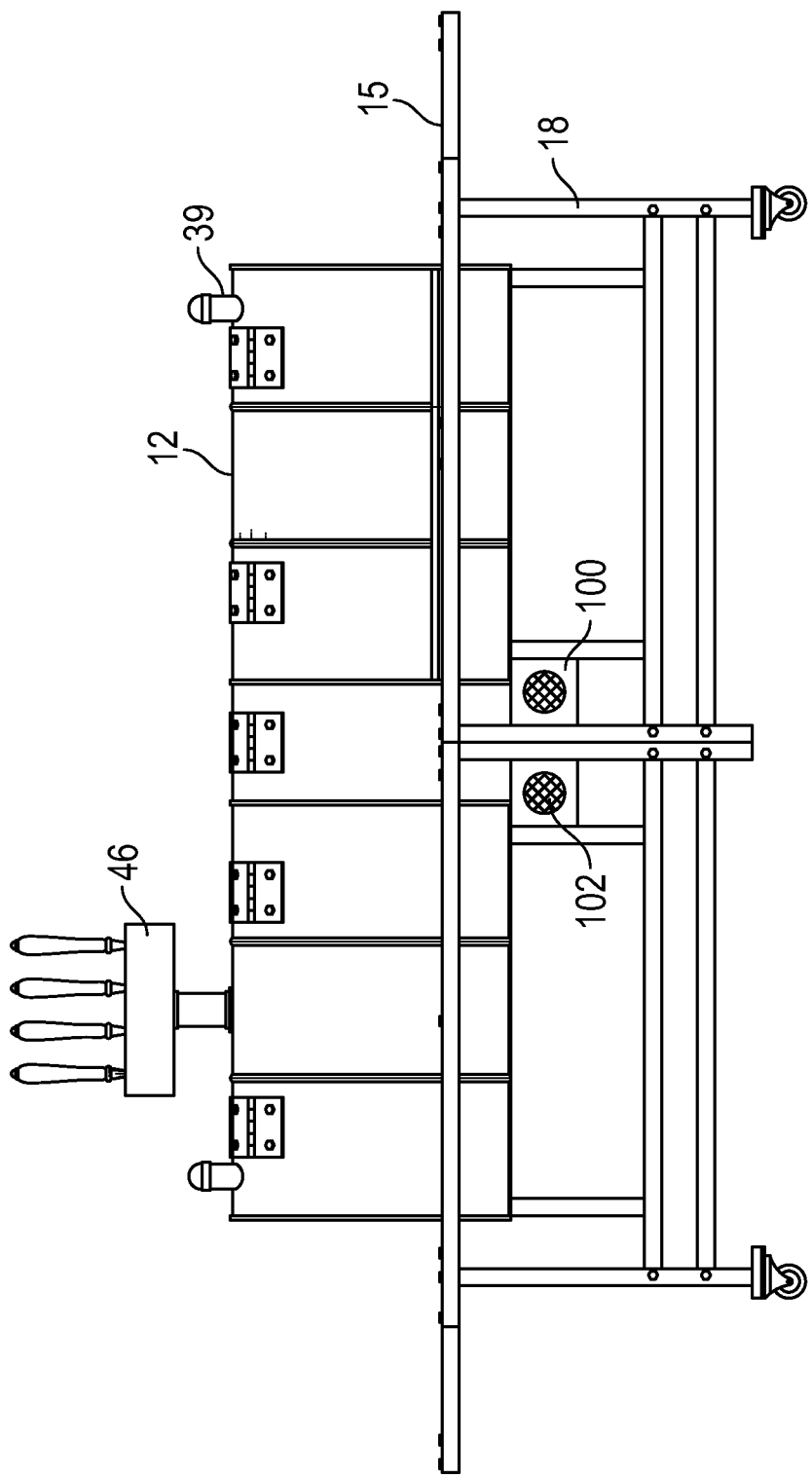
FIG. 7 shows a rear view of an exemplary embodiment of the combined barbecue beverage dispensing system with an entertainment module.

With reference now to FIG. 7, the combined barbecue beverage dispensing system 10 may further include an entertainment module 100 disposed within the frame 18 and in electrical communication with the power source 90. While the entertainment module 100 is shown disposed immediately behind the power source 90, it is understood that the entertainment module 100 may be sub-divided into independent components and disposed throughout the rigid frame 18 and/or the stand 99 of the lighting system 94. The entertainment module 100 may be configured for wired or wireless communication with one or more electronic devices, such as, but not limited to, a mobile device, a home computer, a television, and a home or professional entertainment system.

It is therefore envisioned that when a wired connection is desired, the system 10 may include one or more docking stations configured to simultaneously transmit/receive audio and telephonic data streams and charge the mobile device. Exemplary mobile devices suitable for wired or wireless connectivity to the entertainment module 100 include, but are not limited to, a cellular phone, a tablet computer, a laptop computer, or a wireless remote controller.

The entertainment module 100 may further include at least one speaker 102 configured to broadcasting an audio stream from the one or more electronic devices. In various embodiments, the entertainment module 100 may also include one or more microphones 104 configured to capture sound from an area surrounding the combined barbecue beverage dispensing system. Thus, when a cellular phone is electrically connected to the entertainment module 100, a user may initiate and/or receive a hands-free phone call while cooking food or dispensing beverages similar to hands-free communications in an automotive environment. As such, the wired or wireless communication between the entertainment module 100 and the electronic device may be one-way or two-way transmission of information. In various embodiments where digital thermometers 84 are disposed in the system 10, the thermometers may be in electrical communication with the entertainment module 100 such that temperature information and/or time information may be transmitted to the electronic device. Such transmitted information may further include fill level information about each of the one or more beverage containers 52 and/or gas fill level of the pressurized canister 54.

When configured for wireless communication, the entertainment module 100 may include a transceiver (not shown) that operates in conjunction with a communication standard such as 802.11, Bluetooth, ZigBee, ultra-wideband, GPS, Wi-Fi, Wimax, GPS, radio frequency, or other standard short or medium range communication protocol, or other protocols. Alternatively, or in addition thereto, the transceiver may be configure for direct mobile telephony (i.e., cellular networks) for streaming audio files from the Internet. When so equipped, the control module 98 may include a touchscreen user interface for controlling various features. In various embodiments, the control module 98 may be in electrical communication with the electric motor 64 of the rotisserie 60 to enable a user to control and monitor rotation of the rotisserie through the electronic device.

Although the invention has been described with reference to the above description, it will be understood that modifications and variations are encompassed within the spirit and scope of the invention. Accordingly, the invention is limited only by the following claims.

What is claimed is:

1. A combined barbecue beverage dispensing system comprising:
    (a) a substantially cylindrical body having an axis extending along a horizontal plane, wherein the body is divided into a plurality of isolated chambers by vertical walls disposed therein;
    (b) a rigid frame fixedly attached to a lower exterior surface of the body, the frame comprising at least two cabinets, each cabinet being positioned in alignment with at least one of the isolated chambers;
    (c) at least one food grate slidingly disposed within at least one of the isolated chambers, thereby defining a firebox configured to contain a supply of combustibles that produce heat and smoke upon burning for purposes of cooking and smoke processing foods, wherein the firebox comprises a hinged lid and at least one vent disposed on an upper exterior surface of the body; and
    (d) a draft system disposed within at least one of the isolated chambers, thereby defining a cooling box, the draft system comprising a draft tower fixedly attached to an upper exterior surface of the body in alignment with the cooling box, the draft tower comprising a tower housing, at least one valve and at least one pour spout, wherein the cooling box is configured to accept at least one beverage container, at least one pressurized canister, and a cooling means,
    wherein the firebox and cooling box are separated by at least one isolated chamber.

2. The combined barbecue beverage dispensing system of claim 1, further comprising an insulator disposed within the at least one isolated chamber separating the firebox from the cooling box, thereby defining an insulating box.

3. The combined barbecue beverage dispensing system of claim 2, wherein the insulator is selected from the group consisting of fiberglass, heat resistant refractory mortars, silica fabrics, heat resistant polymers, heat resistant alloys, and combinations thereof.

4. The combined barbecue beverage dispensing system of claim 1, wherein the cooling means is selected from the group consisting of ice and a refrigeration unit.

5. The combined barbecue beverage dispensing system of claim 4, further comprising an electric power source disposed within the frame and configured to supply power to the refrigeration unit if present, and at least one electric socket mounted within the frame operatively connected to the power source and configured to distribute electrical power from the power source.

6. The combined barbecue beverage dispensing system of claim 5, further comprising a lighting system in electrical communication with the power source and configured to distribute light from at least one light source to one or more areas selected from the firebox, the cooling box, and an area surrounding the combined barbecue beverage dispensing system.

7. The combined barbecue beverage dispensing system of claim 6, wherein the lighting system comprises a control unit configured to control power supplied to the at least one light source.

8. The combined barbecue beverage dispensing system of claim 7, wherein the at least one light source is selected from the group consisting of an incandescent bulb, a fluorescent bulb, an LED bulb, and a neon bulb.

9. The combined barbecue beverage dispensing system of claim 1, further comprising at least one shelf fixedly attached to an exterior surface of the frame and positioned parallel to a cooking surface of the food grate.

10. The combined barbecue beverage dispensing system of claim 9, wherein each shelf is formed from a material having a textured surface.

11. The combined barbecue beverage dispensing system of claim 1, wherein the draft system further comprises a service inset disposed within the upper exterior surface of the body and in alignment with the tower housing, wherein the service inset comprises at least one drainage grate positioned parallel to a cooking surface of the food grate and in alignment with the at least one pour spout, wherein the at least one drainage grate is in fluid communication with a drain tube disposed within the frame.

12. The combined barbecue beverage dispensing system of claim 1, further comprising at least one thermometer in each isolated chamber.

13. The combined barbecue beverage dispensing system of claim 12, wherein each thermometer includes a temperature gauge disposed at a position on an exterior surface of the body corresponding with each isolated chamber.

14. The combined barbecue beverage dispensing system of claim 1, wherein the draft tower comprises four valves, four pour spouts, and the cooling box is configured to accept four beverage containers, wherein each valve and pour spout pair corresponds to one of the four beverage containers.

15. The combined barbecue beverage dispensing system of claim 1, wherein the draft tower comprises two valves, two pour spouts, and the cooling box is configured to accept two beverage containers, wherein each valve and pour spout pair corresponds to one of the two beverage containers.

16. The combined barbecue beverage dispensing system of claim 1, wherein the at least one beverage container is independently selected from the group consisting of a beer keg, a blended drink keg, and a soft drink canister.

17. The combined barbecue beverage dispensing system of claim 5, further comprising an entertainment module disposed within the frame and in electrical communication with the power source, the entertainment module being configured for wired or wireless communication with one or more electronic devices selected from the group consisting of a mobile device, a home computer, a television, and a home entertainment system.

18. The combined barbecue beverage dispensing system of claim 17, wherein the mobile device is a cellular phone, a tablet computer, a laptop computer, or a wireless remote controller.

19. The combined barbecue beverage dispensing system of claim 18, wherein the entertainment module comprises at least one speaker for broadcasting an audio stream from the one or more electronic devices.

20. The combined barbecue beverage dispensing system of claim 19, wherein the entertainment module further comprises one or more microphones configured to capture sound from an area surrounding the combined barbecue beverage dispensing system.

21. The combined barbecue beverage dispensing system of claim 17, wherein the wired or wireless communication comprises one-way or two-way transmission of information between the electronic device and the combined barbecue beverage dispensing system.

22. The combined barbecue beverage dispensing system of claim 21, wherein the wireless communication is selected from the group consisting of infrared transmission, Bluetooth protocol, radio frequency, Zigbee wireless technology, GPS, Wi-Fi, WiMAX, and mobile telephony.

23. The combined barbecue beverage dispensing system of claim 21, wherein the information is selected from the group consisting of temperature information, time information, fill level information about each of the one or more beverage containers, gas fill level of the pressurized canister, audio files, and telecommunication information.

24. The combined barbecue beverage dispensing system of claim 5, further comprising a rotisserie disposed within the firebox, the rotisserie comprising at least one spit positioned parallel to the axis of the body and at least one motor in electric communication with the power source, wherein the at least one motor is configured to rotate the at least one spit along the axis of the body.

* * * * *